United States Patent
Lee et al.

(10) Patent No.: US 12,240,931 B2
(45) Date of Patent: Mar. 4, 2025

(54) METHOD FOR MANUFACTURING NITRILE-BASED RUBBER, NITRILE-BASED RUBBER MANUFACTURED THEREBY, AND RUBBER COMPOSITION COMPRISING SAME RUBBER

(71) Applicant: LG Chem, Ltd., Seoul (KR)

(72) Inventors: Jae Min Lee, Daejeon (KR); Byoung Yun Kim, Daejeon (KR); Sung Min Son, Daejeon (KR); Se Eun Lee, Daejeon (KR); Woo Seok Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 798 days.

(21) Appl. No.: 17/422,254

(22) PCT Filed: Oct. 8, 2020

(86) PCT No.: PCT/KR2020/013720
§ 371 (c)(1),
(2) Date: Jul. 12, 2021

(87) PCT Pub. No.: WO2021/071273
PCT Pub. Date: Apr. 15, 2021

(65) Prior Publication Data
US 2022/0089801 A1 Mar. 24, 2022

(30) Foreign Application Priority Data

Oct. 11, 2019 (KR) .................. 10-2019-0126408
Sep. 28, 2020 (KR) .................. 10-2020-0126181

(51) Int. Cl.
*C08F 236/12* (2006.01)
*C08F 2/24* (2006.01)
*C08F 2/26* (2006.01)
*C08F 20/70* (2006.01)
*C08F 36/04* (2006.01)
*C08F 36/06* (2006.01)
*C08F 36/08* (2006.01)
*C08F 36/14* (2006.01)
*C08K 5/41* (2006.01)
*C08K 5/42* (2006.01)
*C08L 9/02* (2006.01)
*C08L 9/04* (2006.01)
*C08L 25/10* (2006.01)
*C08L 35/04* (2006.01)

(52) U.S. Cl.
CPC .............. *C08F 236/12* (2013.01); *C08F 2/24* (2013.01); *C08F 2/26* (2013.01); *C08F 20/70* (2013.01); *C08F 36/04* (2013.01); *C08F 36/045* (2013.01); *C08F 36/06* (2013.01); *C08F 36/08* (2013.01); *C08F 36/14* (2013.01); *C08K 5/41* (2013.01); *C08K 5/42* (2013.01); *C08L 9/02* (2013.01); *C08L 9/04* (2013.01); *C08L 25/10* (2013.01); *C08L 35/04* (2013.01)

(58) Field of Classification Search
CPC ...... C08F 236/12; C08F 36/04; C08F 36/045; C08F 36/06; C08F 36/08; C08F 36/14; C08F 20/70; C08F 2/24; C08F 2/26; C08L 9/02; C08L 9/04; C08L 25/10; C08L 35/04; C08K 5/41; C08K 5/42
See application file for complete search history.

(56) References Cited

U.S. PATENT DOCUMENTS

| | | | |
|---|---|---|---|
| 4,920,176 | A | 4/1990 | Jorgensen, Jr. |
| 5,225,479 | A | 7/1993 | Senyek et al. |
| 5,708,132 | A | 1/1998 | Grimm |
| 6,492,446 | B1 * | 12/2002 | Kajiwara ................ C08K 5/09 524/556 |
| 2002/0198309 | A1 | 12/2002 | Lee et al. |
| 2014/0011936 | A1 | 1/2014 | Hashimoto et al. |
| 2016/0137830 | A1 | 5/2016 | Ahn et al. |
| 2018/0016360 | A1 | 1/2018 | Nakai et al. |
| 2018/0194924 | A1 | 7/2018 | Mosaki |
| 2019/0309116 | A1 | 10/2019 | Lee |

FOREIGN PATENT DOCUMENTS

| | | |
|---|---|---|
| CN | 1278542 A | 1/2001 |
| JP | S60086101 A | 5/1985 |
| JP | H03163118 A | 7/1991 |
| JP | 2001310976 A | 11/2001 |
| KR | 19980018243 A | 6/1998 |
| KR | 20150016093 A | 2/2015 |
| KR | 20150067744 A | 6/2015 |
| KR | 20170041092 A | 4/2017 |
| KR | 101862323 B1 | 5/2018 |
| KR | 20180075394 A | 7/2018 |

(Continued)

OTHER PUBLICATIONS

International Search Report for Application No. PCT/KR2020/013720, mailing dated Jan. 15, 2021, 4 pages.

(Continued)

*Primary Examiner* — Ling Siu Choi
*Assistant Examiner* — David L Miller
(74) *Attorney, Agent, or Firm* — Lerner David LLP

(57) ABSTRACT

Provided are a preparation method of a nitrile-based rubber, a nitrile-based rubber prepared therefrom, and a rubber composition including the nitrile-based rubber, and the nitrile-based rubber has a low content of a residual emulsifier and excellent mechanical physical properties by using a emulsifier mixture including a first emulsifier including a sulfosuccinate ester-based compound, and a second emulsifier including a fatty acid or a metal salt thereof, or a rosin acid or a metal salt thereof, each of which has 12 to 18 carbon atoms and a monocarboxyl group, wherein the first emulsifier and the second emulsifier are included at a weight ratio of 2:1 to 6:1.

13 Claims, No Drawings

(56) References Cited

FOREIGN PATENT DOCUMENTS

WO         2010019180 A1    2/2010
WO         2012137663 A1    10/2012

OTHER PUBLICATIONS

Extended European Search Report for EP Application No. 20874984 dated Jan. 18, 2022, 2 pgs.

* cited by examiner

METHOD FOR MANUFACTURING NITRILE-BASED RUBBER, NITRILE-BASED RUBBER MANUFACTURED THEREBY, AND RUBBER COMPOSITION COMPRISING SAME RUBBER

CROSS-REFERENCE TO RELATED APPLICATIONS

This present application is a national phase entry under 35 U.S.C. § 371 of International Application No. PCT/KR2020/013720 filed Oct. 8, 2020, which claims the priority from Korean Patent Application No. 10-2019-0126408, filed Oct. 11, 2019, and Korean Patent Application No. 10-2020-0126181, filed Sep. 28, 2020, all of which are incorporated herein by reference.

TECHNICAL FIELD

The present invention relates to a preparation method of a nitrile-based rubber having a low content of a residual emulsifier and excellent mechanical physical properties, a nitrile-based rubber prepared therefrom, and a rubber composition including the nitrile-based rubber.

BACKGROUND ART

In general, a nitrile-based rubber is a polymer prepared by copolymerizing an α,β-unsaturated nitrile-based monomer such as acrylonitrile (ACN) and a conjugated diene-based monomer such as butadiene, and has excellent oil resistance by including a repeating unit derived from an α,β-unsaturated nitrile-based monomer.

In addition, the nitrile-based rubber may have varied vulcanization properties depending on the content of the α,β-unsaturated nitrile-based monomer-derived repeating unit included in the rubber, and for example, in the case in which acrylonitrile is used as the α,β-unsaturated nitrile-based monomer, when the content of acrylonitrile is increased, resistance to a hydrocarbon fuel and a petroleum-based fluid is increased, and heat resistance, ozone resistance, abrasion resistance, tensile strength, hardness, and density are increased, but flexibility at low temperatures, rebound elasticity, and gas permeability are decreased.

The nitrile-based rubber is classified into a low-nitrile rubber having a content of an α,β-unsaturated nitrile-based monomer of 18 to 20 wt %, a medium low-nitrile rubber having a content of an α,β-unsaturated nitrile-based monomer of 28-29 wt %, a medium-nitrile-based rubber having a content of an α,β-unsaturated nitrile-based monomer of 33-34 wt %, a high-nitrile-based rubber having a content of an α,β-unsaturated nitrile-based monomer of 38-39 wt %, and an ultra high-nitrile-based rubber having a content of an α,β-unsaturated nitrile-based monomer of 45-48 wt %, and generally, the high-nitrile-based rubber and the ultra high-nitrile-based rubber are used in the fields requiring resistance to hydrocarbons having a high aromatic content such as gasoline, the medium-nitrile-based rubber is used in rubber products in which swelling is not a problem or oils having a low aromatic content, and the medium low-nitrile-based rubber and the low-nitrile-based rubber are mainly used in liquids having an insignificant swelling effect such as a paraffin oil or polyalphaolefin or in the manufacture of foamed insulation, a hose, and the like requiring low-temperature properties such as cold resistance (low temperature resistance).

Meanwhile, the nitrile-based rubber is generally prepared by emulsion polymerization using a fatty acid or rosin acid, each of which has 12 to 18 carbon atoms and a monocarboxyl group, as an emulsifier at a low temperature of 5 to 15° C., and the emulsifier has problems in that the emulsifier is added in a relatively excessive amount and most of the amount remains as an impurity in the nitrile-based rubber, so that the mechanical physical properties of the nitrile-based rubber prepared by emulsion polymerization are deteriorated and a glass transition temperature range becomes wider, thereby limiting the application fields of the nitrile-based rubber and making the processing difficult.

Accordingly, development of a preparation method of a nitrile-based rubber in which most of the emulsifier is removed after polymerization so that a content of a residual emulsifier is low, so that the nitrile-based rubber has excellent mechanical physical properties, is currently needed.

DISCLOSURE

Technical Problem

The present invention was contrived for solving the problems of the background art, and the object of the present invention is to provide a preparation method of a nitrile-based rubber having a low content of a residual emulsifier and excellent mechanical physical properties.

In addition, another object of the present invention is to provide a nitrile-based rubber having a low content of a residual emulsifier, prepared by the above preparation method.

In addition, still another object of the present invention is to provide a rubber composition including the nitrile-based rubber.

Technical Solution

In one general aspect, a preparation method of a nitrile-based rubber includes: polymerizing a monomer mixture including an α,β-unsaturated nitrile-based monomer and a conjugated diene-based monomer in the presence of an emulsifier mixture (S1), wherein the emulsifier mixture includes a first emulsifier including a sulfosuccinate ester-based compound and a second emulsifier including a fatty acid or rosin acid, each of which has 12 to 18 carbon atoms and a monocarboxyl group, and the first emulsifier and the second emulsifier are included at a weight ratio of 2:1 to 6:1.

In another general aspect, a nitrile-based rubber which is prepared by the above preparation method and has a content of a residual emulsifier of 1.2 wt % or less, the emulsifier being a sulfosuccinate ester-based compound, a fatty acid or a rosin acid, each of which has 12 to 18 carbon atoms and a monocarboxyl group, is provided.

In still another general aspect, a nitrile-based rubber composition includes the nitrile-based rubber.

Advantageous Effects

In the preparation method according to the present invention, the content of impurities derived from an emulsifier is decreased, while an emulsion polymerization is easily performed with a decreased use amount of an emulsifier, thereby preparing a nitrile-based rubber having excellent mechanical physical properties.

In addition, the nitrile-based rubber according to the present invention prepared by the above preparation method may have a very low content of a residual emulsifier, thereby having an effect of excellent mechanical physical properties.

BEST MODE

The terms and words used in the description and the claims of the present invention are not to be construed as a general or dictionary meaning but are to be construed as meaning and concepts meeting the technical ideas of the present invention based on a principle that the inventors can appropriately define the concepts of terms in order to describe their own inventions in the best mode.

The present invention provides a preparation method of a nitrile-based rubber having a low content of a residual emulsifier to allow preparation of a nitrile-based rubber having excellent mechanical physical properties.

The preparation method of a nitrile-based rubber according to the present invention includes: polymerizing a monomer mixture including an α,β-unsaturated nitrile-based monomer and a conjugated diene-based monomer in the presence of an emulsifier mixture (S1), wherein the emulsifier mixture includes a first emulsifier including a sulfosuccinate ester-based compound and a second emulsifier including a fatty acid or rosin acid, each of which has 12 to 18 carbon atoms and a monocarboxyl group, the first emulsifier and the second emulsifier are included at a weight ratio of 2:1 to 6:1.

Generally, the nitrile-based rubber is prepared by emulsion polymerization using an emulsifier such as a fatty acid or rosin acid, each of which has 12 to 18 carbon atoms and a monocarboxyl group, in which the emulsifier is used at 2 to 3 parts by weight based on 100 parts by weight of a monomer for smooth emulsion polymerization, and the emulsifier is not removed in a post-treatment process such as agglomeration after polymerization and mostly remains as an impurity in the nitrile-based rubber, thereby causing deterioration of properties such as mechanical physical properties of the nitrile-based rubber and vulcanization physical properties. However, in the preparation method according to the present invention, an emulsifier mixture in which a first emulsifier including a sulfosuccinate ester-based compound and a second emulsifier including a fatty acid or rosin acid, each of which has 12 to 18 carbon atoms and a monocarboxyl group, are mixed at a specific ratio is used as an emulsifier, thereby performing sufficiently smooth emulsion polymerization with a reduced use amount than a common emulsifier use amount and removing most of the emulsifier in a post-treatment process to significantly decrease a content of a residual emulsifier, and thus, a nitrile-based rubber having excellent mechanical physical properties and vulcanization physical properties and a low content of the residual emulsifier may be prepared.

Specifically, (S1) is a step of polymerizing a monomer mixture including an α,β-unsaturated nitrile-based monomer and a conjugated diene-based monomer to prepare a nitrile-based rubber, and may be performed by emulsion-polymerizing a monomer mixture including an α,β-unsaturated nitrile-based monomer and a conjugated diene-based monomer in the presence of a first emulsifier including a sulfosuccinate ester-based compound and a second emulsifier including a fatty acid or rosin acid, each of which has 12 to 18 carbon atoms and a monocarboxyl group.

Here, the emulsifier mixture may include the first emulsifier and the second emulsifier at a weight ratio of 2:1 to 6:1, specifically 4:1 to 6:1, and within the range, the emulsion polymerization may be smoothly performed and the content of the residual emulsifier which remains in the nitrile-based rubber and acts as an impurity may be significantly decreased. Meanwhile, when a ratio of the first emulsifier in the emulsifier mixture is increased, the content of the residual emulsifier in the prepared nitrile-based rubber may be further increased, but the emulsion polymerization is not performed well, so that a conversion rate is decreased or emulsion performance is deteriorated to decrease productivity, and thus, it may be important to adjust the ratio to the range when applying the emulsifier mixture. In addition, the emulsifier mixture may be used at 1.0 to 1.5 parts by weight, or specifically, 1.0 to 1.3 parts by weight, based on 100 parts by weight of the monomer mixture, and within the range, the content of the residual emulsifier in the prepared nitrile-based rubber may be very low while smooth emulsion polymerization may be performed. Specifically, when a use amount of the emulsifier mixture is 1.5 parts by weight or less, an amount of the residual emulsifier may be minimized, and improvement of all mechanical physical properties may be expected therefrom and simultaneously a decrease in polymerization productivity may be prevented.

Meanwhile, in the present invention, the first emulsifier including the sulfosuccinate ester-based compound may be the sulfosuccinate ester-based compound itself or a solution of the sulfosuccinate ester-based compound dissolved in the solvent.

The sulfosuccinate ester-based compound may be a compound represented by the following Chemical Formula 1 or an alkali metal salt thereof:

[Chemical Formula 1]

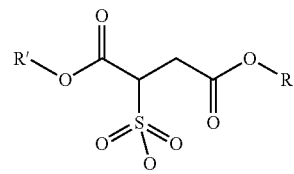

wherein

R and R' are each independently an alkyl group having 1 to 20 carbon atoms.

Specifically, in Chemical Formula 1, R and R' may be each independently an alkyl group having 3 to 10 carbon atoms.

More specifically, the sulfosuccinate ester-based compound may be an alkali metal salt of the compound represented by Chemical Formula 1, wherein the alkali metal may be sodium, and more specifically, the sulfosuccinate ester-based compound may be a dihexyl sulfosuccinate sodium salt.

When the emulsifier mixture includes the sulfosuccinate ester-based compound, the content of the residual emulsifier in the rubber in a post-treatment process of agglomeration and drying after polymerization may be decreased, emulsification properties may be excellent even in the case of adding a small amount of the emulsifier mixture, and vulcanization properties and mechanical properties may be significantly excellent.

In addition, in the present invention, the second emulsifier including a fatty acid or rosin acid, each of which has 12 to 18 carbon atoms and a monocarboxyl group may be the fatty acid or rosin acid itself or in the form of a metal salt thereof, or may be a solution of the fatty acid or rosin acid dissolved in the solvent.

In addition, the monomer mixture may be the α,β-unsaturated nitrile-based monomer and the conjugated diene-based monomer at a weight ratio of 15:85 to 45:55, specifically 18:82 to 45:55 or 18:82 to 35:65, and within the range, a nitrile-based rubber having excellent flexibility, oil resistance, and tensile strength may be prepared.

The α,β-unsaturated nitrile-based monomer may be one or more selected from the group consisting of acrylonitrile, methacrylonitrile, α-chloronitrile, and α-cyanoethylacrylonitrile, and specifically, may be acrylonitrile.

The conjugated diene-based monomer may be one or more selected from the group consisting of 1,3-butadiene, 2,3-dimethyl-1,3-butadiene, 2-ethyl-1,3-butadiene, 1,3-pentadiene, and isoprene, and specifically, may be 1,3-butadiene.

Meanwhile, in the emulsion polymerization, a polymerization initiator may be further used, and the polymerization initiator may be one or more selected from the group consisting of inorganic peroxides, organic peroxides, and nitrogen-based compounds as a radical initiator.

The inorganic peroxide may be one or more selected from the group consisting of sodium persulfate, potassium persulfate, ammonium persulfate, potassium perphosphate, and hydrogen peroxide, and specifically, may be ammonium persulfate.

In addition, the organic peroxide may be one or more selected from the group consisting of di-isobutyl hydroperoxide, t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butyl peroxyisobutylate, and specifically, may be p-menthane hydroperoxide.

In addition, the nitrogen-based compound may be one or more selected from the group consisting of azobisisobutyronitrile, azobis-2,4-dimethylvaleronitrile, azobiscyclohexanecarbonitrile, and methyl azobisisobutyrate, and specifically, may be azobisisobutyronitrile.

The polymerization initiator may be used at 0.01 parts by weight to 2 parts by weight or 0.03 parts by weight to 1 part by weight, based on 100 parts by weight of the monomer mixture, and within the range, a polymerization degree may be adjusted to prepare a nitrile-based rubber having appropriate density and excellent viscoelasticity properties.

In addition, the polymerization may be performed in a temperature range of 5° C. to 90° C. or 5° to 50°, and if necessary, one or more additives selected from the group consisting of a molecular weight modifier, a chelating agent, an oxidizing-reducing agent, a dispersing agent, a pH adjusting agent, a deoxidizer, an anti-aging agent, and an oxygen capturing agent may be further used.

Meanwhile, in the preparation method according to an exemplary embodiment of the present invention, an agglomeration step and a drying step may be further performed after the polymerization of (S1).

The nitrile-based rubber prepared by the polymerization may be in the state of a nitrile-based rubber latex, and the agglomeration may be a step of treating with an aqueous inorganic salt solution on the latex to perform salt agglomeration and forming a nitrile-based rubber latex agglomerate, for agglomerating the nitrile-based rubber latex.

The salt agglomeration is for removing impurities (such as the residual emulsifier) from the nitrile-based rubber latex and obtaining a nitrile-based rubber latex agglomerate and may be performed by a common method, but for example, may be performed by heating the aqueous inorganic salt solution to 50° C. to 70° C., adding the nitrile-based rubber latex, and then performing stirring for 10 minutes to 1 hour.

The aqueous inorganic salt solution is a mixture of an inorganic salt and distilled water, and though not limited thereto, the pH thereof may be 2 to 11, and the inorganic salt may be one or more selected from the group consisting of potassium chloride, sodium chloride, manganese chloride, calcium chloride, magnesium sulfate, and aluminum sulfate, specifically calcium chloride.

The drying is for removing moisture from the nitrile-based rubber latex agglomerate produced by the agglomeration to obtain nitrile-based rubber particulates, and may be performed by heating to 80° C. to 130° C. or 80° C. to 110° C. Within the range, a remaining moisture amount may be appropriately adjusted without causing thermal deformation.

In addition, the present invention provides a nitrile-based rubber prepared by the preparation method.

The nitrile-based rubber according to an exemplary embodiment of the present invention is prepared by the preparation method and is characterized in that the content of the residual emulsifier is 0.1 to 1.2 wt %, 0.1 to 0.9 wt %, 0.1 to 0.7 wt %, or 0.2 to 0.7 wt %, in which the residual emulsifier may be a sulfosuccinate ester-based compound, and a fatty acid or rosin acid, each of which has 12 to 18 carbon atoms and a monocarboxyl group, or a residual material derived therefrom.

In general, the nitrile-based rubber is prepared by emulsion polymerization using 2-3 parts by weight of the emulsifier based on 100 parts by weight of the monomer, and the total amount of the emulsifiers used above is present as an impurity in the thus-prepared nitrile-based rubber and the content of the residual emulsifier in the rubber is more than 2 wt %, but the nitrile-based rubber according to the present invention is prepared by the preparation method using the emulsifier mixture as described above, thereby significantly decreasing the content of the residual emulsifier in the rubber.

In addition, the present invention provides a nitrile-based rubber composition including the nitrile-based rubber.

The nitrile-based rubber composition according to the present invention includes the nitrile-based rubber, and if necessary, one or more additives selected from the group consisting of a vulcanizer, a vulcanization accelerator, a dispersing agent, a reinforcing filler, and a dissolution accelerator may be further included.

The vulcanizer may be one or more selected from the group consisting of sulfur powder, sublimed sulfur, precipitated sulfur, surface-treated sulfur, insoluble sulfur, sulfur chloride, sulfur dichloride, morpholine disulfide, alkylphenol disulfide, N,N'-dithio-bis(hexahydro-2H-azepinone), and polysulfide.

The vulcanization accelerator may be one or more selected from the group consisting of zinc oxide, N-tert-butyl-2-benzothiazolsulfenamide (TBBS), and tetramethyl thiuram monosulfite (TMTM).

The dispersing agent may be one or more selected from the group consisting of a stearic acid, an oleic acid, a palmitic acid, and a (anhydrous)maleic acid.

The reinforcing filler may be one or more selected from the group consisting of carbon black, silica, limestone, mica, clay, and bentonite.

The dissolution accelerator may be one or more selected from the group consisting of di(2-ethylhexyl)adipate, di(2-ethylhexyl)phthalate, and diisodecyl phthalate.

In addition, in an exemplary embodiment of the present invention, a molded article produced from the nitrile-based rubber composition including the nitrile-based rubber may have excellent mechanical physical properties, and for example, may have a tensile strength of 210 kg·f/cm$^2$ to 230 kg·f/cm$^2$, an elongation of 390% to 500%, and a modulus at 300% of 135 kg·f/cm$^2$ to 140 kg·f/cm$^2$, the tensile strength being measured in accordance with ASTM D412 after vulcanizing the rubber composition at 145° C. for 45 minutes.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Example 1

0.04 parts by weight of p-menthane hydroperoxide as a polymerization initiator, 28 parts by weight of acrylonitrile, 72 parts by weight of 1,3-butadiene, 0.5 parts by weight of t-dodecyl mercaptan as a molecular weight modifier, 190 parts by weight of water, and 1.2 parts by weight of an emulsifier mixture were added to a reactor. Here, the emulsifier mixture was a mixture of a dihexyl sulfosuccinate sodium salt (CYTEC, MA80) and a potassium oleate salt (LG Household & Health Care, Elofad TL070) at a weight ratio of 5:1. Subsequently, a polymerization reaction was started at 10° C., performed for 8 hours, and then finished to prepare a nitrile-based rubber latex.

Thereafter, an aqueous calcium chloride solution was added to the latex so that the thus-prepared nitrile-based rubber latex and calcium chloride in the aqueous calcium chloride solution have a weight ratio of 100:2, heating at 65° C. was performed to perform agglomeration to prepare a nitrile rubber latex agglomerate, and drying in an oven at 100° C. was performed to prepare a nitrile-based rubber.

Example 2

A nitrile-based rubber was prepared in the same manner as in Example 1, except that a mixture of dihexyl sulfosuccinate sodium salt (CYTEC, MA80) and a potassium oleate salt (LG Household & Health Care, Elofad TL070) at a weight ratio of 2:1 was used as the emulsifier mixture.

Example 3

A nitrile-based rubber was prepared in the same manner as in Example 1, except that a mixture of dihexyl sulfosuccinate sodium salt (CYTEC, MA80) and a potassium oleate salt (LG Household & Health Care, Elofad TL070) at a weight ratio of 6:1 was used as the emulsifier mixture.

Example 4

A nitrile-based rubber was prepared in the same manner as in Example 1, except that a mixture of a dioctyl sulfosuccinate sodium salt (Merck, 577-11-7) and a potassium oleate salt (LG Household & Health Care, Elofad TL070) at a weight ratio of 5:1 was used as the emulsifier mixture.

Example 5

A nitrile-based rubber was prepared in the same manner as in Example 1, except that a mixture of a dibutyl sulfosuccinate sodium salt (Merck, 5144-51-4) and a potassium oleate salt (LG Household & Health Care, Elofad TL070) at a weight ratio of 5:1 was used as the emulsifier mixture.

Comparative Example 1

A nitrile-based rubber was prepared in the same manner as in Example 1, except that 1.2 parts by weight of a potassium oleate salt (LG Household & Health Care, Elofad TL070) was used instead of the emulsifier mixture.

Comparative Example 2

A nitrile-based rubber was prepared in the same manner as in Example 1, except that 2.0 parts by weight of a potassium oleate salt (LG Household & Health Care, Elofad TL070) was used instead of the emulsifier mixture.

Comparative Example 3

A nitrile-based rubber was prepared in the same manner as in Example 1, except that 1.2 parts by weight of a dihexyl sulfosuccinate sodium salt (CYTEC, MA80) was used instead of the emulsifier mixture.

Comparative Example 4

A nitrile-based rubber was prepared in the same manner as in Example 1, except that 2.0 parts by weight of a dihexyl sulfosuccinate sodium salt (CYTEC, MA80) was used instead of the emulsifier mixture.

Comparative Example 5

A nitrile-based rubber was prepared in the same manner as in Example 1, except that a mixture of dihexyl sulfosuccinate sodium salt (CYTEC, MA80) and a potassium oleate salt (LG Household & Health Care, Elofad TL070) at a weight ratio of 1:1 was used as the emulsifier mixture.

Comparative Example 6

A nitrile-based rubber was prepared in the same manner as in Example 1, except that a mixture of dihexyl sulfosuccinate sodium salt (CYTEC, MA80) and a potassium oleate salt (LG Household & Health Care, Elofad TL070) at a weight ratio of 1:2 was used as the emulsifier mixture.

Comparative Example 7

A nitrile-based rubber was prepared in the same manner as in Example 1, except that a mixture of dihexyl sulfosuccinate sodium salt (CYTEC, MA80) and a potassium oleate salt (LG Household & Health Care, Elofad TL070) at a weight ratio of 1:5 was used as the emulsifier mixture.

Comparative Example 8

A nitrile-based rubber was prepared in the same manner as in Example 1, except that a mixture of dihexyl sulfosuccinate sodium salt (CYTEC, MA80) and a potassium oleate salt (LG Household & Health Care, Elofad TL070) at a weight ratio of 7:1 was used as the emulsifier mixture.

Experimental Example 1

A Mooney viscosity of the nitrile-based rubbers prepared in the above Examples and Comparative Examples was measured and the results are shown in the following Table 1.

The Mooney viscosity was measured by measuring and reading values at 1 minute of preheating with a large rotor at 100° C. and 4 minutes after starting the rotor, using a Mooney viscometer (MV2000, Alpha Technologies).

TABLE 1

| Classification | Mooney viscosity |
|---|---|
| Example 1 | 44.7 |
| Example 2 | 45.1 |
| Example 3 | 44.9 |
| Example 4 | 45.8 |
| Example 5 | 43.8 |
| Comparative Example 1 | 45.5 |
| Comparative Example 2 | 46 |
| Comparative Example 3 | 45.4 |
| Comparative Example 4 | 45.5 |
| Comparative Example 5 | 44.8 |
| Comparative Example 6 | 44.6 |
| Comparative Example 7 | 44.9 |
| Comparative Example 8 | 44.0 |

As shown in Table 1, it may be confirmed that the Mooney viscosities of the nitrile-based rubbers of Examples 1 to 5 according to an exemplary embodiment of the present invention and the Mooney viscosities of the nitrile-based rubbers of Comparative Examples 1 to 8 were at a similar level, and thus, the nitrile-based rubber as in the conventional preparation method may be easily prepared by the preparation method using the emulsifier mixture of the present invention.

Experimental Example 2

Contents of a residual emulsifier of each nitrile-based rubber prepared in the Examples and Comparative Examples were measured. In addition, rubber compositions including each nitrile-based rubber were prepared, the Mooney viscosity, the vulcanization properties, and the mechanical properties thereof were compared and analyzed, and the results are shown in Table 2.

1) Preparation of Rubber Composition 100 parts by weight of each nitrile-based rubber, 1.5 parts by weight of sulfur powder, 3 parts by weight of zinc oxide and 0.7 parts by weight of N-tert-butyl-2-benzothiazolsulfenamide as a vulcanization accelerator, 1 part by weight of a stearic acid as a dispersing agent, and 40 parts by weight of carbon black as a reinforcing filler were added to a reactor and mixed while stirring at 50 rpm at 50° C. for 8 minutes (premixing for 1 minute and compounding for 7 minutes) to prepare a nitrile-based rubber composition.

2) Mooney Viscosity (C-MV)

After each rubber composition was vulcanized at 145° C. for 45 minutes, the Mooney viscosity was measured by measuring and reading values at 1 minute of preheating with a large rotor at 100° C. and 4 minutes after starting the rotor using a Mooney viscometer (MV2000, Alpha Technologies).

3) Hardness

After each rubber composition was vulcanized at 145° C. for 45 minutes, a hardness at 25° C. was measured in accordance with ASTM D2240 and the unit is a Shore D scale.

4) Vulcanization Properties

A maximum torque (MH) value was measured when each rubber composition was vulcanized at 170° C., using an oscillating disc rheometer.

In addition, Ts'1 (time required until vulcanization of 1%), Tc'90 (time required for vulcanization of 90%) were measured. Here, Tc' 90 means a vulcanization speed.

5) Mechanical Properties

An elongation (e %) and a modulus at 300% (kg·f/cm$^2$) were measured in accordance with ASTM D412, after each rubber composition was vulcanized at 145° C. for 45 minutes.

A tensile strength (kg·f/cm$^2$) of a 300% vulcanized product was measured in accordance with ASTM D412, after each rubber composition was vulcanized at 145° C. for 45 minutes.

6) Content of Residual Emulsifier in Rubber

A content of the residual emulsifier included in each nitrile-based rubber prepared in the Examples and the Comparative Examples was measured as a content with respect to total nitrile-based rubber weights. Specifically, a crude rubber sample to be measured was dissolved in tetrahydrofuran (THF), methanol reprecipitation was pretreated twice, and a content of the emulsifier in the polymer was analyzed using LC/MS chromatogram. The measurement results were calculated as wt % of the content of the emulsifier by total weight as compared with the standard sample.

TABLE 2

| Classification | Mooney viscosity (C-MV) | Hardness | Content of residual emulsifier (wt %) | Vulcanization properties | | | Mechanical properties | | |
|---|---|---|---|---|---|---|---|---|---|
| | | | | MH | Ts' 1 (min) | Tc' 90 (min) | Tensile strength (kg·f/cm$^2$) | Elongation (%) | Modulus at 300% (kg·f/cm$^2$) |
| Example 1 | 76.9 | 71 | 0.25 | 26.5 | 1.41 | 4.44 | 229.7 | 414.2 | 138.7 |
| Example 2 | 77.5 | 71 | 0.45 | 25.9 | 1.44 | 4.54 | 215.5 | 400.3 | 137.4 |
| Example 3 | 77.1 | 71 | 0.24 | 26.4 | 1.40 | 4.46 | 221.4 | 406.7 | 138.1 |
| Example 4 | 77.4 | 70 | 0.66 | 26.1 | 1.35 | 4.23 | 215.3 | 405.1 | 135.5 |
| Example 5 | 77.0 | 71 | 0.27 | 25.4 | 1.50 | 4.61 | 213.4 | 393.7 | 133.5 |

TABLE 2-continued

| Classification | Mooney viscosity (C-MV) | Hardness | Content of residual emulsifier (wt %) | Vulcanization properties MH | Ts' 1 (min) | Tc' 90 (min) | Mechanical properties Tensile strength (kg·f/cm²) | Elongation (%) | Modulus at 300% (kg·f/cm²) |
|---|---|---|---|---|---|---|---|---|---|
| Comparative Example 1 | 77.9 | 71 | 1.24 | 26.0 | 1.51 | 4.81 | 202.1 | 386.0 | 133.5 |
| Comparative Example 2 | 78.1 | 71 | 2.12 | 25.5 | 1.56 | 4.95 | 203.4 | 387.1 | 131.8 |
| Comparative Example 3 | 76.7 | 71 | 0.3 | 25.5 | 1.43 | 4.45 | 206.1 | 381.5 | 132.4 |
| Comparative Example 4 | 74.6 | 71 | 0.45 | 24.4 | 1.42 | 4.49 | 210.1 | 383.5 | 130.1 |
| Comparative Example 5 | 77.0 | 71 | 0.66 | 26.1 | 1.45 | 4.49 | 212.4 | 391.0 | 130.1 |
| Comparative Example 6 | 76.3 | 71 | 0.81 | 25.3 | 1.52 | 4.67 | 200.2 | 390.6 | 130.3 |
| Comparative Example 7 | 76.1 | 71 | 1.1 | 25.2 | 1.55 | 4.91 | 205.6 | 391.4 | 132.1 |
| Comparative Example 8 | 76.1 | 70 | 0.46 | 26.0 | 1.40 | 4.53 | 209.0 | 382.7 | 131.1 |

As shown in Tables 1 and 2, it may be confirmed that Examples 1 to 5 showed greatly improved vulcanization properties and mechanical properties while showing hardness and Mooney viscosities at a similar level to Comparative Examples 1 to 8, and also had decreased contents of the residual emulsifier.

In particular, Examples 1 to 5 all had greatly improved tensile strength, elongations, and moduli at 300% even as compared with Comparative Examples 2 and 4 which used a larger amount of the emulsifier.

In addition, when only the first emulsifier was used (Comparative Examples 3 and 4), mechanical physical properties such as the elongation were significantly deteriorated as compared with other Examples using the first and second emulsifiers at specific contents in combination, and on the contrary, when only the second emulsifier was used (Comparative Examples 1 and 2), the content of the residual emulsifier was excessively increased in addition to the deterioration in the mechanical physical properties.

Meanwhile, in Examples 1 to 3 including the dihexyl sulfosuccinate sodium salt in the emulsifier mixture, it may be confirmed that the content of the residual emulsifier in the rubber in the post-treatment process of agglomeration and drying after polymerization was low, as compared with the case of including a sulfosuccinate sodium salt substituted with an alkyl group having a relatively large number of carbons. In addition, in Examples 1 to 3, it may be confirmed that the emulsification properties are excellent even with addition of a small amount of the emulsifier, as compared with the case of including a sulfosuccinate sodium salt substituted with a relatively low alkyl group, and thus, the vulcanization properties and the mechanical properties were significantly excellent.

Thus, it may be confirmed that by using the emulsifier mixture including the first emulsifier and the second emulsifier at a specific ratio according to the preparation method of the present invention, emulsion polymerization may be smoothly performed even with use of a smaller amount, and the content of the residual emulsifier may be decreased to improve the mechanical physical properties.

The invention claimed is:

1. A method for preparing a nitrile-based rubber, the method comprising: polymerizing a monomer mixture comprising an α,β-unsaturated nitrile-based monomer and a conjugated diene-based monomer in the presence of an emulsifier mixture, wherein the emulsifier mixture comprises a first emulsifier comprising a sulfosuccinate ester-based compound, and a second emulsifier comprising a fatty acid or a metal salt thereof, or a rosin acid or a metal salt thereof, each of which has 12 to 18 carbon atoms and a monocarboxyl group, and the first emulsifier and the second emulsifier are included at a weight ratio of 2:1 to 6:1, wherein the sulfosuccinate ester-based compound is represented by Chemical Formula 1 or an alkali metal salt thereof:

[Chemical Formula 1]

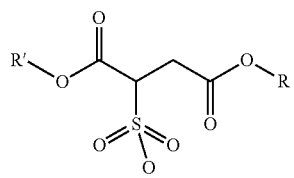

wherein
R and R' are each independently an alkyl group having 1 to 20 carbon atoms.

2. The method of claim 1, wherein the first emulsifier and the second emulsifier are included at a weight ratio of 4:1 to 6:1.

3. The method of claim 1, wherein the emulsifier mixture is used at 1.0 to 1.5 parts by weight, based on 100 parts by weight of the monomer mixture.

4. The method of claim 1, wherein in Chemical Formula 1, R and R' are each independently an alkyl group having 3 to 10 carbon atoms.

5. The method of claim 1, wherein the α,β-unsaturated nitrile-based monomer and the conjugated diene-based monomer are included at a weight ratio of 15:85 to 45:55.

6. The method of claim 1, wherein the α,β-unsaturated nitrile-based monomer is one or more selected from the group consisting of acrylonitrile, methacrylonitrile, α-chloronitrile, and α-cyanoethylacrylonitrile.

7. The method of claim 1, wherein the conjugated diene-based monomer is one or more selected from the group consisting of 1,3-butadiene, 2,3-dimethyl-1,3-butadiene, 2-ethyl-1,3-butadiene, 1,3-pentadiene, and isoprene.

8. The method of claim 1, further comprising: agglomerating and drying after the polymerizing.

9. A nitrile-based rubber prepared by the method of claim 1, wherein a content of a residual emulsifier is 0.1 to 1.2 wt %, and the residual emulsifier comprises the sulfosuccinate ester-based compound, and the fatty acid or a metal salt thereof, or the rosin acid; or a metal salt thereof.

10. A nitrile-based rubber composition comprising the nitrile-based rubber of claim 9.

11. The method of claim 1, wherein the sulfosuccinate ester-based compound is a dihexyl sulfosuccinate sodium salt.

12. The method of claim 8, wherein the agglomerating is performed by treating with an aqueous solution of an inorganic salt.

13. The method of claim 12, wherein the inorganic salt is one or more selected from the group consisting of potassium chloride, sodium chloride, manganese chloride, calcium chloride, magnesium sulfate, and aluminum sulfate.

* * * * *